(12) United States Patent
Craske et al.

(10) Patent No.: US 9,983,872 B2
(45) Date of Patent: *May 29, 2018

(54) CONDITIONAL SELECTION OF DATA ELEMENTS

(71) Applicant: ARM Limited, Cambridge (GB)

(72) Inventors: Simon John Craske, Cambridge (GB); Richard Roy Grisenthwaite, Cambridge (GB); Nigel John Stephens, Cambridge (GB)

(73) Assignee: ARM Limited, Cambridge (GB)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/666,978

(22) Filed: Aug. 2, 2017

(65) Prior Publication Data

US 2017/0329603 A1 Nov. 16, 2017

Related U.S. Application Data

(63) Continuation of application No. 13/200,348, filed on Sep. 23, 2011, now Pat. No. 9,753,724.

(30) Foreign Application Priority Data

Oct. 12, 2010 (GB) .................................. 1017176.7

(51) Int. Cl.
*G06F 9/38* (2018.01)
*G06F 9/30* (2018.01)

(52) U.S. Cl.
CPC ...... *G06F 9/30003* (2013.01); *G06F 9/30072* (2013.01); *G06F 9/30094* (2013.01); *G06F 9/3842* (2013.01)

(58) Field of Classification Search
None
See application file for complete search history.

(56) References Cited

U.S. PATENT DOCUMENTS 5,537,560 A 7/1996 Boggs et al.
5,805,913 A 9/1998 Guttag et al.
(Continued)

FOREIGN PATENT DOCUMENTS

CN 101482812 7/2009
EP 0 385 566 9/1990
(Continued)

OTHER PUBLICATIONS

U.S. Appl. No. 13/200,348, filed Sep. 23, 2011, Inventor: Craske et al.

(Continued)

*Primary Examiner* — John Lindlof
(74) *Attorney, Agent, or Firm* — Nixon & Vanderhye P.C.

(57) ABSTRACT

An apparatus performs an operation on a register, and then conditionally selects either that register or a further register on which no operation has been performed. The apparatus includes a decoder that decodes a conditional select instruction that specifies a primary source register, a secondary source register, a destination register, a condition, and an operation to be performed on a data element from the secondary source register. A data processor is responsive to the decoded conditional select instruction and the condition (i) having a predetermined outcome to perform the operation on the data element from the secondary source register to form a resultant data element and to store the resultant data element in the destination register, and (ii) not having the predetermined outcome to form the resultant data element from the data element from the primary register and to store the resultant data element in the destination register.

30 Claims, 9 Drawing Sheets

(56) References Cited

U.S. PATENT DOCUMENTS

| | | |
|---|---|---|
| 2002/0002666 A1 | 1/2002 | Dulong et al. |
| 2005/0257032 A1 | 11/2005 | Wilson |
| 2006/0149803 A1 | 7/2006 | Siu et al. |
| 2006/0236078 A1 | 10/2006 | Sartorius et al. |
| 2007/0208924 A1 | 9/2007 | Ford |
| 2010/0134330 A1 | 6/2010 | Sakaguchi |

FOREIGN PATENT DOCUMENTS

| | | |
|---|---|---|
| JP | 4-363722 | 12/1992 |
| JP | 2001-022576 | 1/2001 |
| JP | 2008-537231 | 9/2011 |
| JP | 2013-530450 | 7/2013 |
| WO | 0385566 | 9/1990 |

OTHER PUBLICATIONS

Office Action dated Jan. 9, 2015 in co-pending U.S. Appl. No. 13/200,348, 24 pages.
Office Action dated Jul. 29, 2015 in co-pending U.S. Appl. No. 13/200,348, 25 pages.
Final Office Action dated Feb. 11, 2016 in co-pending U.S. Appl. No. 13/200,348, 19 pages.
International Search Report and Written Opinion of the International Searching Authority dated Dec. 20, 2011 in PCT/GB2011/051847.
Japanese Office Action dated Oct. 2, 2014 in JP 2013-533280 and English Translation, 17 pages.
ARM Limited, "ARM Architectural Reference Manual DDI 01001" Jul. 2005, 10 pages.
Intel Japan Corporation, "Pentium Pro Family Developers Manual, Second volume: Programmer's Reference Manual" and Abridged Translation, 1996, 10 pages.
Office Action and Search Report dated Dec. 29, 2014 from Chinese Application No. 20118004921.2.3, pp. 1-7.
Chinese Second Office Action dated Jun. 12, 2015 in CN 20118004921.2.3 and English translation, 7 pages.
English translation of Taiwanese Office Action dated Jul. 23, 2015 in TW 100135780, 10 pages.
European Office Action dated Mar. 7, 2016 issued in EP 11767046.3, 6 pages.
Malaysian Modified Substantive Examination Adverse Report dated Jan. 29, 2016 in MY Application No. PI 2013700502, 3 pages.
Korean Office Action dated Feb. 20, 2017 in KR 10-2013-7009023 and English translation, 7 pages.
UK Search Report for GB Application No. 1017176.7, dated Feb. 3, 2011, 2 pages.

CSEL         Rd, Rn, Rm, Cond      → Rd = F(Cond, Flags)?  Rn: Rm $C_{sel}$.INC    Rd, Rn, Rm, Cond      → Rd = F(Cond, Flags)?  Rn: (Rm+1)

$C_{sel}$.INV    Rd, Rn, Rm, Cond      → Rd = F(Cond, Flags)?  Rn: $\overline{(Rm)}$ $C_{sel}$.INV.INC, Rd, Rn, Rm, Cond   → Rd = F(Cond, Flags)?  Rn: $\overline{(Rm+1)}$=-Rm Flags | N | Z | C | V |      Cond 4 bits

FIG. 4

Conditional selection between 1 and 0      $R_0$ maps to zero $C_{sel}$.INC   Rd, Ro, Ro, Cond → Rd = F(Cond, Flags)?   $R_0$: $R_0$+1

Conditional selection between 0 and a mask of all 1s $C_{sel}$.INV   Rd, Ro, Ro, Cond → Rd = F(Cond, Flags)?   $R_0$: $\overline{R_0}$ $R_3$=ABS($R_3$)

CMP R3, #0

CSEL.INC.INV   $R_3$, $R_3$, $R_3$, LT   (select -ve value if <)

Conditional increment of a value
CSEL.INC   $R_3$, $R_4$, $R_4$, Cond   where cond $R_3$ = $R_{4+1}$ else $R_4$

CMP $R_B$, #0

CSEL.INC   $R_A$, $R_A$, $R_A$, EQ

---

If (B>0)   A = 1 ehe A=0

CMP $R_B$ #0

CSEL. INC,   $R_\emptyset$, $R_\emptyset$, $R_A$, GT

FIG. 5 (cont)

| 31 | 30 | 29 21 | 20 16 | 15 12 | 11 | 10 5 | 9 5 | 4 0 |
|---|---|---|---|---|---|---|---|---|
| SF | INVERT | OPCODE | Rm | Cond | 0 | Increment | Rn | Rd |

FIG. 6

CONDITIONAL SELECTION OF DATA ELEMENTS

CROSS-REFERENCE

This application is a continuation of U.S. application Ser. No. 13/200,348 filed Sep. 23, 2011, which claims priority to GB Application No. 1017176.7 filed Oct. 12, 2010, the entire contents of each of which are incorporated herein by reference in this application.

BACKGROUND

The present invention relates to the field of data processing apparatus and in particular, to the field of conditional select instructions for selecting a source data element based on a condition.

Conditional instructions have been used in processing, for example by ARM® of Cambridge UK, and these instructions instruct a processor to perform processing operations only in response to predefined conditions being met. Examples of the conditions that may be required to be met are things such as less than, more than, equal to, negative, carry in, zero etc.

A disadvantage of these conditional instructions particularly in high end processing apparatus that perform instructions at least partially in parallel with each other, is that an instruction subsequent to the conditional instruction in the instruction stream that requires a result of the conditional instruction as in input, may require the original value or an updated result value depending on whether the condition is met or not. As the subsequent instruction may have entered the pipeline while the conditional instruction is still within the pipeline, either the original value or the result value may need to be made available in the pipeline to the subsequent instruction. This may require an additional read of the original value which has quite a high overhead in terms of speed and power.

Select instructions that cause a processor to select a result to be written to a destination register from a choice of two source registers based on a condition being met are also known.

It would be desirable to be able to keep much of the functionality of the conditional instructions while still maintaining performance.

SUMMARY

Viewed from a first aspect, the present invention provides a data processing apparatus comprising: a data store comprising a plurality of storage elements for storing data elements; an instruction decoder configured to decode at least one conditional select instruction, said at least one conditional select instruction specifying a primary source storage element, a secondary source storage element, a condition, and an operation to be performed on a data element stored in said secondary source storage element; a data processor configured to perform data processing operations controlled by said instruction decoder wherein: said data processor is responsive to said decoded at least one conditional select instruction and said condition having a predetermined outcome to perform said operation on said data element from said secondary source storage element to form a resultant data element; and said data processor is responsive to said decoded at least one conditional select instruction and said condition not having said predetermined outcome to form said resultant data element from said data element within said primary storage element.

The present invention recognises that conditional select instructions are an efficient way of selecting a particular value stored in a storage element in response to a predetermined outcome of a condition. The predetermined outcome may be the condition being met, or it may be it not being met. It also recognises that if the conditional select instruction causes an operation to be performed on a value in one of the storage elements then this can provide an instruction with many of the properties of a conventional conditional instruction without many of the performance drawbacks, as to access the result one of two storage elements is simply selected.

In some embodiments said instruction further specifies a destination storage element, said data processor being responsive to said at least one conditional select instruction to store said resultant data element in said destination storage element.

The instruction may specify a destination storage element in which the resultant data element is to be stored or it may be configured to simply overwrite a predetermined storage location with the resultant data element.

In some embodiments, the destination storage element may be one of the source storage elements, while in other embodiments it may be a different storage element.

In some embodiments, said data processor is responsive to said decoded at least one conditional select instruction and said condition not having said predetermined outcome to perform said operation on said data element within said secondary source storage element and to form said resultant data element from said data element within said primary storage element.

Where the condition does not have the predetermined outcome then it is the primary storage element that is selected as the source of the resultant data element. In some embodiments, although it is the primary storage element that is selected the operation specified by the conditional select instruction is still performed on the data element within the secondary source storage element. Although, in this case the result of this operation is not required, it can however be advantageous to perform this operation anyway as generally it is determining the outcome of the condition that takes a significant amount of the execution time of the instruction and thus, if the operation is performed in the secondary storage element before it is known if the condition has the predetermined outcome then both storage elements are ready for selection once the outcome of the condition has been determined and the latency of the procedure is reduced.

In some embodiments, said at least one conditional select instruction comprises an increment conditional select instruction, said operation comprising incrementing said data element from said secondary source storage element.

The conditional select instruction can have different operations associated with it but in some embodiments, it comprises an increment conditional select instruction wherein the operation comprises incrementing the selected data element.

In other embodiments, it comprises an invert conditional select instruction where the operation comprises logically inverting the selected data element to generate a logically bit-wise inverted storage element value.

These two operations could be combined in some embodiments to form an invert increment conditional select instruction. Inverting in a logically bit-wise fashion and then incrementing a value generates an arithmetic negation of that data element.

In some embodiments, said storage element data store comprises a storage element name that maps to a zero value.

The provision of conditional select instructions which have operations associated with them such as inversion and incrementation as well as the possibility of a storage element that maps to a zero value provides a processing apparatus with the ability to perform many different operations which map to operations performed by many legacy conditional instructions. Examples of these are given later. In this way, many conditional instructions that were provided in legacy systems can be mimicked using this conditional select function in an appropriate way. This conditional select function provides an efficient and convenient way of providing the functionality of legacy conditional instructions without many of the performance drawbacks.

It would be clear to a skilled person that the storage elements can be a number of things, for example they could in some embodiments be registers while in other embodiments they may be memory locations.

In some embodiments, said instruction decoder is configured to output an increment control signal in response to said conditional select instruction; and said processor configured to process said decoded conditional select instructions comprises: an adder configured to receive values from said secondary storage element and a carry in signal; a multiplexer configured to receive signals from said primary storage element and from an output of said adder, a select signal for said multiplexer comprising said condition, such that said condition having said predetermined outcome triggers said multiplexer to select said output of said adder; wherein in response to said increment control signal being set, said carry in signal is set to one and said adder increments a received value from said at least one source storage element.

A further advantage of embodiments of the present invention is that the circuitry required to implement these functions is straightforward processing circuitry that may in many cases be present in the processor and can be re-used to provide the required functionality. For example, the increment operation can be provided using an adder and a carry in signal, the increment control signal setting the carry in signal and the select function for the multiplexer being be the outcome of the condition.

In some embodiments, said instruction decoder is configured to output an invert control signal in response to said conditional select instruction; and said processor configured to process said decoded conditional select instructions comprises: an adder configured in response to said invert control signal being set to receive values from said secondary source storage element through an inverter and in response to said invert control signal not being set to receive values from secondary source storage elements not passed through said inverter; a multiplexer configured to receive signals from said primary source storage element and from an output of said adder, a select signal for said multiplexer comprising said condition, such that said condition having said predetermined outcome triggers said multiplexer to select said output of said adder.

The invert functionality can be provided using an inverter and if this is coupled with an adder then the inversion and the incrementation can be combined if required.

For example, in some embodiments said instruction decoder is configured to output an increment control signal and an invert control signal in response to said conditional select instruction; wherein in response to said increment signal being set, said carry in signal is set to one and in response to said invert signal having being set said adder increments said received inverted value from said secondary source storage element.

Providing the ability to invert and increment means that an arithmetic negated value can be provided in the form of a 2's compliment value.

In some embodiments, said primary source storage element and said secondary source storage element are a same storage element.

Although different source storage elements can be used, in some embodiments they are the same storage element. In this case if the condition has a predetermined outcome a result element is formed from the value in the storage element on which an operation has been performed, while if the condition does not have this predetermined outcome then the data element stored is used to form the resultant data element. This may be advantageous in that the conditional selection then becomes perform the operation if condition has predetermined outcome and don't if it doesn't have predetermined outcome. One way of implementing this is to form two paths from the storage element, one passing through the functional circuitry that performs the operations and the other going directly from the storage element, the path chosen to transmit the resultant element being dependent on the outcome of the condition.

In some embodiments, an outcome of said condition is determined from arithmetic logic flags set in response to at least one previous data processing operation.

Whether the condition has a predetermined outcome or not may be determined from arithmetic logic flags that are set in status storage elements of the computer in response to a least one previous data processing operation. These previous data processing operations are performed in response to at least one instruction performed prior to the conditional select instruction, and these operations determine the result of the condition, i.e. whether it is met or not and set flags in accordance with this. Thus, in order to determine whether the condition has a certain outcome a certain condition code is compared with the flags and if there is a match then it is determined that the condition has the predetermined outcome and if there is no match it is determined that it doesn't. Clearly, this system could be inverted such that the non-match is the predetermined outcome and the match is not the predetermined outcome.

The previous data processing operation might be a number of things, but in some embodiments it comprises comparing a data element within at least one of the source storage elements with another value.

The condition code may be something such as, is the value in source storage element B less than a certain value. To determine the outcome of this condition the value stored in storage element B is compared with the certain value that it should be less than by performing a subtraction of the certain value from the value in storage element B and the arithmetic logic flags are set in response to this. This operation is performed in response to an earlier instruction in the instruction stream. Thus, if the negative flag is set the condition has been met.

In other embodiments, said at least one previous data processing operation comprises comparing a data element in said primary source storage element with a data element in said secondary source element.

It may be appropriate to compare the values in the two source storage elements and only perform certain operations if they have a certain relationship to each other. If this is the condition then again the earlier processing operation may be one which compares these values and sets the flags and the condition being met or not can be determined from the status flags.

The condition can be a number of things, for example it might be not equal to, equal to, less than, greater than, greater than or equal to, less than or equal to, zero or negative. All of these conditions can be determined from the condition flags.

The arithmetic logic flags comprise at least one of a result negative flag, a result zero flag, a carry out flag and a sign overflow flag. Thus, the comparison between the values is often a subtraction and a negative result will indicate that one of the values was greater than the other, similarly a zero result will indicate that they were equal and so on.

In some embodiments, said predetermined outcome of said condition comprises said condition being met.

As noted previously, the predetermined outcome of the condition may be the condition being met, alternatively, it may be the condition not being met.

In some embodiments, said data processing apparatus comprises arithmetic circuitry for performing add and subtract operations in response to arithmetic instructions, wherein at least some of said circuitry for performing said operation on said data element within said secondary source storage element in response to said conditional select instruction comprises said arithmetic circuitry.

As noted previously, the operations such as increment, that the conditional select function may perform may be performed using arithmetic circuitry. If this arithmetic circuitry is already present in the processor for performing add and subtract operations then it may be convenient to re-use this circuitry for performing the conditional select instructions. In such a case, the functionality of this instruction can be provided without the addition of much extra circuitry, thereby making efficient use of the circuit area.

In some embodiments said conditional select instruction comprises an indicator indicating a width of said source and destination storage elements.

Embodiments of the present invention are suitable for use with apparatus that may use storage elements of different widths. Thus, for example the hardware may have registers as its storage elements that are 64 bits wide, but may on occasion run code that uses 32 bit wide storage elements. In such a case the indicator can be set and the relevant portion of the registers accessed.

A second aspect of the present invention provides a method of data processing apparatus comprising: receiving at least one conditional select instruction specifying a primary source storage element, a secondary source storage element, a destination storage element, a condition, and an operation to performed on a data element within said secondary source storage element; decoding said at least one received conditional select instruction; determining if said condition has a predetermined outcome; if said condition has said predetermined outcome selecting said secondary source storage element and performing said operation on a data element from said selected storage element to form a resultant data element; and if said condition does not have said predetermined outcome selecting said data element within said primary storage element to form said resultant data element.

A third aspect of the present invention provides a computer program product storing a computer program comprising a conditional select instruction, which is operable when execution of the data processor to control the data processor to perform the steps of a method according to a second aspect of the present invention.

A fourth aspect of the present invention provides a means for processing data comprising: storage element storing means for storing data elements in storage elements; an instruction decoding means for decoding at least one conditional select instruction, said at least one conditional select instruction specifying a primary source storage element, a secondary source storage element, a condition, and an operation to be performed on a data element from said secondary source storage element; a processing means for performing data processing operations controlled by said instruction decoding means wherein: said processing means is responsive to said decoded at least one conditional select instruction and said condition having a predetermined outcome to perform said operation on said data element from said secondary source storage element to form a resultant data element; and said processing means is responsive to said decoded at least one conditional select instruction and said condition not having said predetermined outcome to form said resultant data element from said data element within said primary storage element.

A fifth aspect of the present invention provides a virtual machine provided by a computer program executing upon a data processing apparatus, said virtual machine providing an instruction execution environment according to the data processing apparatus of a first aspect of the present invention.

The above, and other objects, features and advantages of this invention will be apparent from the following detailed description of illustrative embodiments which is to be read in connection with the accompanying drawings.

BRIEF DESCRIPTION OF THE DRAWINGS

FIG. 4 shows a conditional select instruction and example status flags according to an embodiment of the present invention;

FIG. 5 shows examples of how the conditional select instruction can be used to perform functions that mimic legacy condition instructions;

FIG. 6 shows a flow diagram illustrating a method according to an embodiment of the present invention;

DESCRIPTION OF EXAMPLE EMBODIMENTS

Figure 1:
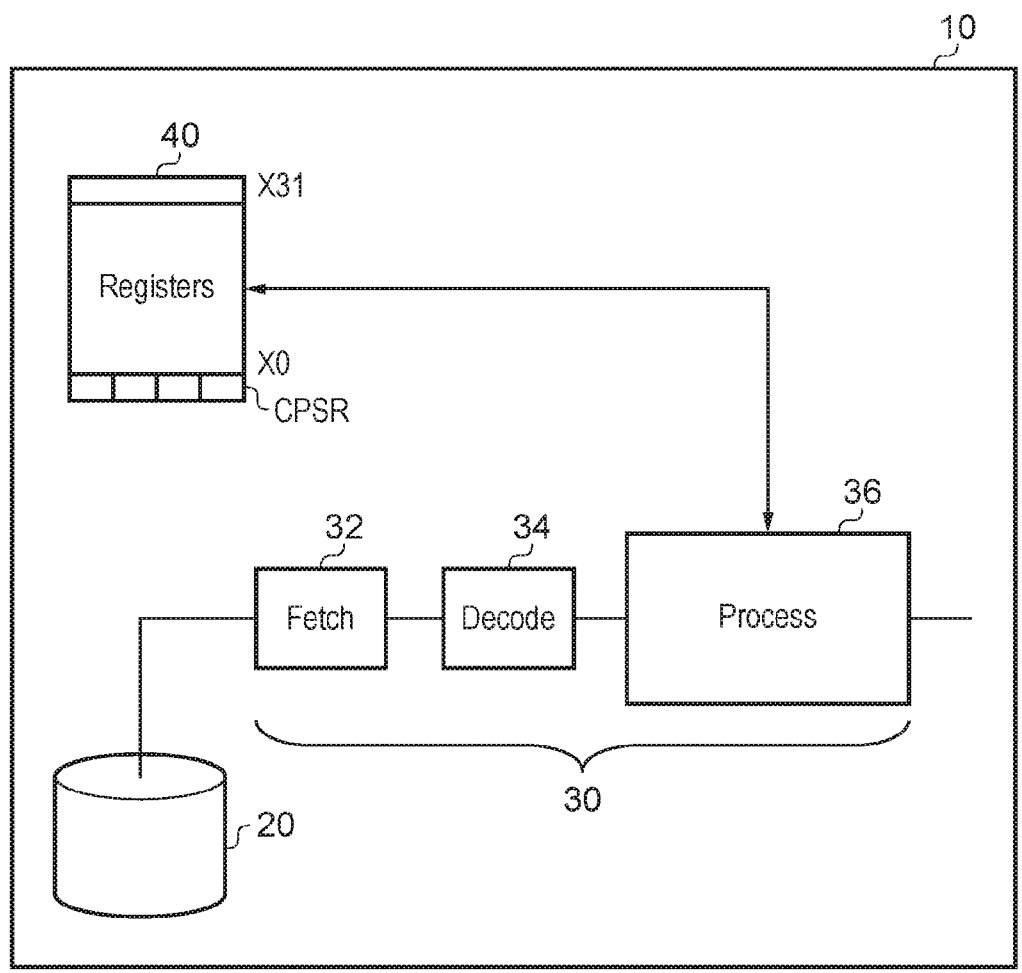
FIG. 1 shows a data processing apparatus according to an embodiment of the present invention.

FIG. 1 shows a data processing apparatus 10 according to an embodiment of the present invention. This data processing apparatus 10 has a data store 20 for storing instructions to be processed. It has a pipeline 30 for processing the instructions including a fetch unit 32 for fetching instructions from the instruction store 20, an instruction decoder 34 for decoding these instructions and a processing unit 36 for processing the decoded instruction.

There is also a register bank 40 comprising a plurality of registers. Processing unit 36 writes and reads data to and from these registers. The register bank includes a program status register CPSR which contains the status flags of the processor. These status flags are set in response to processing operations and can be used by the processor to determine particular conditions or states of the processor.

In this embodiment there is also a register X31 which maps to 0. Thus, when this register is selected by an instruction a 0 value is always given.

One instruction that the decoder 34 is configured to decode is a conditional select instruction. In response to this decoded instruction the processor performs an operation specified by this instruction on one of the source registers specified by the instruction and then it selects either this source register or another register as the destination register into which the resultant element is written.

Figure 2:
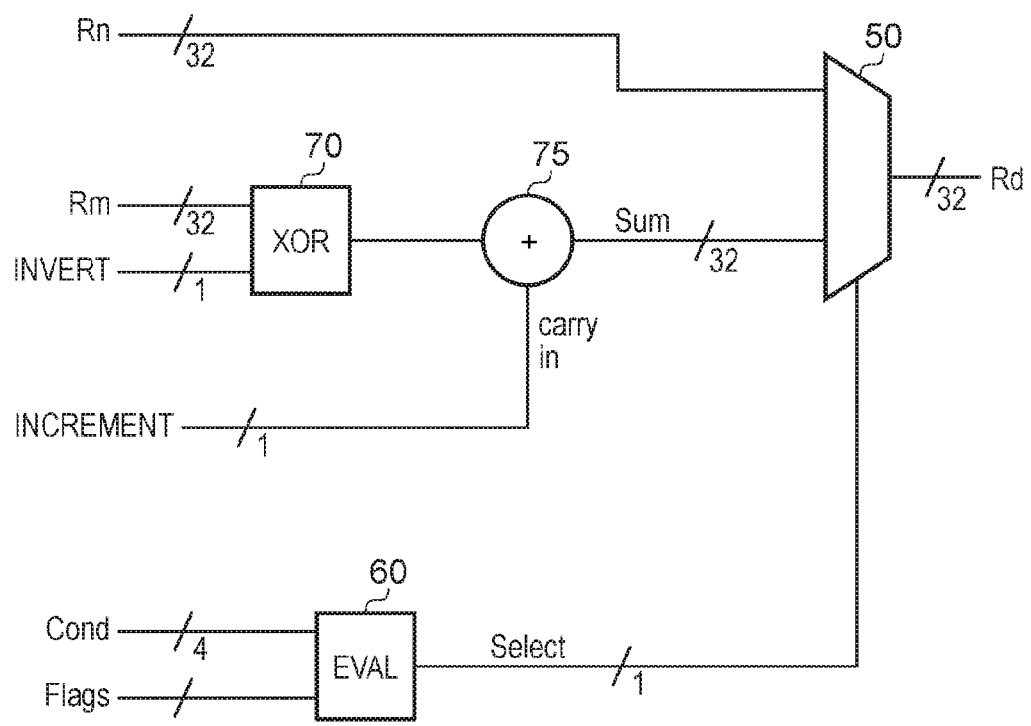
FIG. 2 shows a processing circuitry for performing a conditional select instruction according to an embodiment of the present invention.

FIG. 2 shows an example of processing circuitry within processing unit 36 that can be used to perform these processing operations in response to such a conditional select instruction.

In embodiments of the present invention, the conditional select instruction can perform one of two operations on a value in one of the registers. It can increment it in response to the increment control signal being set or it can invert the value by performing a logical bit-wise inversion of every bit in the value stored in response to the invert control flag being set. The conditional select instruction is dependent on a condition and thus, it is determined whether the condition is met or not and in dependence upon this one or other of the registers is output.

Thus, in the embodiment of FIG. 2 there are two source registers $R_n$ and $R_m$. In this embodiment they are both 32 bits wide, although in alternative embodiments they may be 64 bits wide. In other embodiments they may be 64 bits wide, but they are treated as 32 bit registers in response to a select bit being set in the conditional select instruction and only the lower or higher 32 bits are written to or read from.

One of the registers $R_m$ is the secondary register upon which any operations that the conditional select instruction may specify are performed. Thus, in this embodiment the conditional select instruction may specify an invert operation, an increment operation or both or neither. If neither is specified then the conditional select function simply selects either register $R_m$ or register $R_n$ using multiplexer 50.

It should be noted that although registers $R_m$ and $R_n$ are shown as different registers they could in embodiments of the present invention be the same register with a data path directly from the register going to the multiplexer and another going through the functional circuitry.

The select signal of multiplexer 50 is determined from the condition associated with the instruction which is evaluated using an evaluation unit 60. In this embodiment the evaluation unit 60 compares a condition code associated with this instruction with the arithmetic logic flags stored in the CPSR register of the processing apparatus. If there is a match between the condition code and the flags then it is determined that the condition is met and register $R_m$ is selected. If there is no match then register $R_n$ is selected.

Thus, in the basic case where neither the invert nor the increment signal are set, the instruction acts as a conditional select function instruction and either $R_m$ or $R_n$ are selected in dependence upon the condition being met or not. If however it is an invert conditional select instruction then the invert signal is set and XOR gate 70 acts to bit-wise invert each of the bits in register $R_m$ and an inverted value is output via adder 75 to multiplexer 50. If the increment signal is not set then it is simply the bit-wise inverted value that is output to the destination register $R_d$ if the select function selects register $R_m$. If the select function selects register $R_n$ then the bit-wise inversion is performed but the result of the inversion is not selected to be output to the destination register.

There is also an increment signal that is input to this processing circuitry and this arrives at the adder 75 as a carry in signal, thus when the increment signal is set the adder receives a carry in. Thus, when the increment signal is set the value output from the XOR gate 70 which in the case of invert not being set is the value stored in register $R_m$ and in the case of the invert signal being set is the inverted value stored in register $R_m$ is incremented and is selected using multiplexer 50 if the condition has the predetermined outcome. If both the invert and the increment signals are set then the value output is the negated 2's compliment value of the value stored in register $R_m$. If just the increment signal is set it is simply the value stored in register $R_m$ incremented by 1.

It should be noted that the operations performed on the value stored in register $R_m$ are performed before the selection using multiplexer 50. Thus, if the register $R_m$ is not selected these operations are performed for no purpose. However, the evaluation of the condition code generally takes a significant time and thus, it can be advantageous if the result of this is only required towards the end of the operations that are to be performed.

Figure 3:
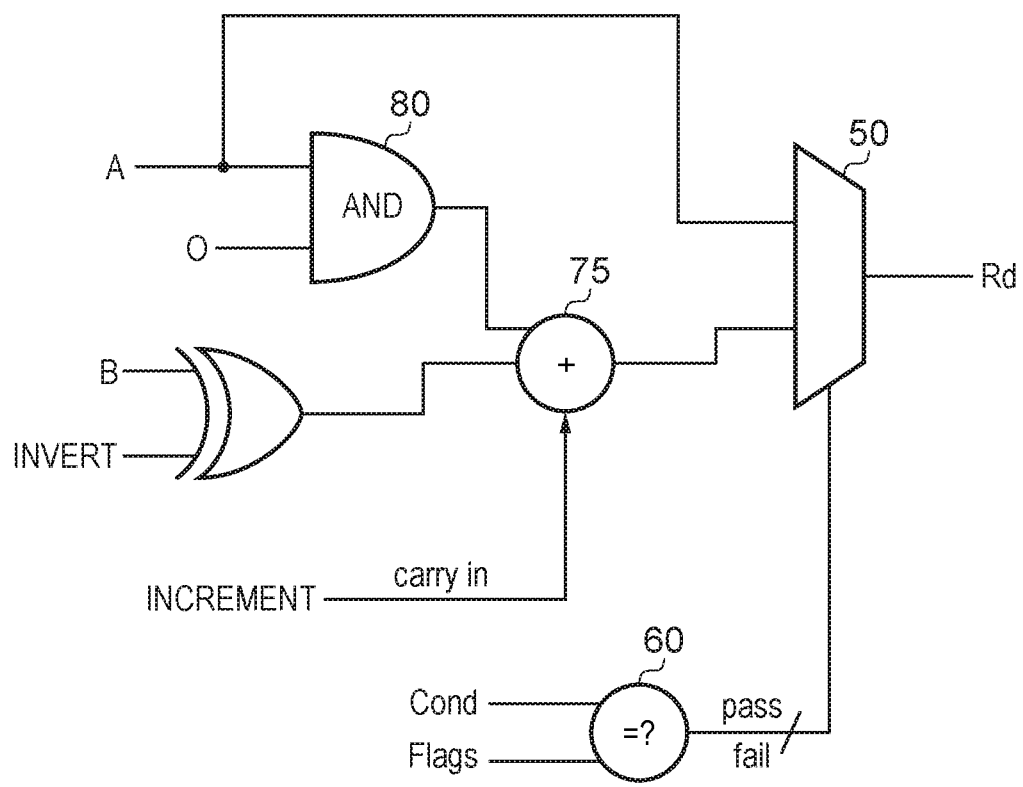
FIG. 3 shows arithmetic circuitry within a data processing apparatus that is being reused for performing a conditional select instruction according to an embodiment of the present invention.

FIG. 3 shows an alternative embodiment of this processing circuitry that is similar to that shown in FIG. 2 but is re-using adder circuitry 75 within the generally arithmetic circuitry of the processing apparatus. Thus, when compared to FIG. 2 there is an additional AND gate 80 that is used when the processing circuitry is performing a conditional select instruction to mask out the register A input to adder 75. Thus, when the conditional select instruction is being executed a 0 is input to the AND gate so that the value stored in register A does not reach the adder. When used as part of arithmetic circuitry for general processing operations the AND gate does not mask out the register A input and adder 75 may be used to add registers A and B or register A with an inverted value of register B.

In the case of a conditional select function the adder 75 is used to increment the value stored in register B or to increment the inverted value stored in register B and thus, the other input to the adder (register A) that is present for performing general arithmetic instructions is masked out using AND gate 80. In other ways, this circuitry is the same as the circuitry of FIG. 2.

The XOR logic provides an inversion function by producing an intermediate result based on bit-wise exclusive ORing, each bit within register B with the INVERT signal. It should be appreciated that this circuitry may be merged with the processor's main arithmetic unit as is shown in FIG. 3 or it may be built as separate circuitry as shown in FIG. 2.

FIG. 4 shows examples of different types of conditional select instructions and the values that they output. Thus, in response to a conditional select instruction for which there is no invert or increment signal, either the value stored in the primary register $R_n$ or the value stored in the secondary register $R_m$ is output to the destination register depending upon whether the conditions match the arithmetic logic flags or not.

In response to a conditional select instruction for which the increment signal is set the value received from register $R_m$ is incremented and once again depending on the condition and the flags either the value stored in register $R_n$ or the value stored in register $R_m$ that has been incremented is output to the destination register.

If the invert signal is set then the value from register $R_m$ is bit-wise inverted and once again, depending on whether the condition code matches the flags either the inverted value of $R_m$ or the value stored in $R_n$ is written to the destination register.

If the invert and the increment bits are set then the value from register $R_m$ is both inverted and incremented. This generates the two compliment value of the value stored in $R_m$ which is the arithmetic negated version of the original value. Once again depending on whether the condition code matches the flags either the value stored in register $R_n$ or the inverted incremented value from register $R_m$ is written to the destination register.

With regard to the condition code, this is in this embodiment a four bit code which indicates the pattern of flags required to select register $R_m$ as opposed to selecting register $R_n$. The flags are stored in the CPSR register as a four bit value and comprise N, Z, C and B. N indicates a negative result, Z indicates a 0 result, C indicates a carry out and B indicates a signed arithmetic overflow. These flags are set by earlier data processing operations. Thus, prior to the conditional select instruction being executed, operations are executed that perform the comparisons required to determine whether the condition of the conditional select instruction is met or not. These operations may be performed in response to comparison instructions that set flags as a result of their comparisons. To determine whether or not a condition is met a condition code that matches a certain flag value indicative of the condition being met can be encoded within the conditional select instruction and a simple comparison of this code against the flags will determine whether the condition is met or not.

These earlier processing instructions may take the form of comparison instructions for comparing perhaps a value in one of the source registers with another value in a source register or perhaps comparing a source register value with a set value. Generally, the comparison instruction performs a subtract operation and the result of this sets the arithmetic flags. Thus, if the instruction and condition code are that B will be incremented if A is less than B then the comparison could subtract A from B and if the result is negative the N flag is set and thus, the condition code should have a pattern that matches the N flag being set. This comparison instruction can be performed in advance of the conditional select instruction it can even be performed several instructions in advance provided there are no intermediate instructions that set the arithmetic logic flags.

As noted previously, one of the advantages of this conditional select instruction is that it can provide the functionality of previous conditional instructions without some of the drawbacks. FIG. 5 shows example conditional instructions that the conditional select instruction can provide functionality equivalent to.

Thus, in a first example the conditional select instruction can provide a selection between 1 and 0. This uses the register that maps to 0. In this figure, this is shown for simplicity as R0, although in the embodiment shown in FIG. 1 it was register 31 that was set to map to the value 0. In this case, the register that maps to 0 is used as both source registers and the increment function is used such that either the 0 value can be selected or the increment of the 0 value can be selected dependent on the condition and thus, depending on the condition either a 0 or a 1 can be output.

The conditional select instruction can also be used to select between a 0 value and a mask of all 1's. In this case, the invert operation is used and once again the register that maps to 0 is used as the two-source registers. In this case, either this register is selected as the destination register or an inverted version of this register is selected. An inverted version of this register will be a mask of 1's and thus, depending on whether the condition is met or not either a 0 value register or a mask of 1's is provided to the destination register.

The conditional select instruction can also be used to output the absolute value stored in a register. In order to provide this functionality, the condition flags are set initially by comparing the value in this register which in this example is given as R3 with the value of 0. The conditional select instruction with the increment and the invert functions selected is then used with register R3 as both source register and destination register and the condition is less than. Thus, if R3 is less than 0, in other words if it is a negative value the value stored in R3 is incremented and inverted which provides the two's compliment value of this value in other words the negative value. Thus, if the value stored in R3 is negative it is negated which means that the positive version of the value stored in R3 is output. If however the value stored in R3 is positive then the condition less than is not met and the value stored in the primary register which is also R3 is output. Thus, by using this particular conditional select instruction an absolute value instruction is provided.

The next example provides a conditional increment to a value and in this case the conditional select instruction has the increment operation selected. In this case, the primary register is given as R3 and the secondary register as the destination register. The condition is the value stored in R3 equals the incremented value stores in R4 thus, if this is the case the value stored in R3 is output. If it is not the case then the value stored in R4 is incremented and stored in R4.

The following instruction shows how the condition related to the instruction may not depend on values stored in the source registers but may relate to a value stored in another register. The conditional select instruction in this case is used to mimic a conditional instruction that, if the value stored in B is equal to 0 then the value stored in A should be incremented. In order to perform this using the conditional select instruction, the initial instruction that is used to set the flags is a compare the value in register B with 0. The conditional select instruction that is then executed is one where the increment operation is performed and the source and destination registers are the same and the condition is equal. Thus, if the comparison instruction of Register B with 0 was equal, the Z flag will have been set as this comparison instruction was in effect a subtraction.

The condition code of the instruction indicates that the flag 0 should be set. If this is the case, then the value in the secondary register that has been incremented is stored in register A, in other words A is incremented. If the 0 flag was not set, in other words the value stored in register B was not equal to 0 then the value in the primary register which is also register A is output. In this case no operation is performed on the primary register and thus its value is output rather than its incremented value.

The final example in FIG. 5 shows how if B is greater than 0, A can be set to 1 else A is set to 0 can be performed using a conditional select instruction. In this case, the comparison instruction that is used to set the flags is compare register B with 0. The conditional select instruction that is then executed has the increment signal set and has the source registers being the register that maps to 0 and the destination register, in this case Register A. Thus, if the comparison instruction of Register B with 0 showed that Register B was greater than 0, the secondary register is selected and as the increment value is set this 0 value input has been incremented by 1 and 1 is stored in register A. If the condition was not met so that B was not greater than 0 then the primary register is selected which is register 0 and 0 is stored in register A.

Thus, as can be seen in the examples above the conditional select instruction can be used to provide many different functions that are executed on a conditional basis. Furthermore, as is clear from the earlier figures the conditional select instruction can be implemented with simple circuitry.

FIG. 6 shows an example conditional select function according to an embodiment of the present invention. In this example there is a select indicator SF which indicates whether the instruction is operating on a 32 bit register or a 64 bit register. This enables the instruction to be used in processors that have can process either 32 bit values or 64 bit values. It should be noted that in other embodiments this flag could be used to select between different sized values depending on the nature of the processor the instruction is used in.

There is a single bit invert field which controls the XOR logic of FIGS. 2 and 3 and determines whether the value in the secondary register is inverted or not. There is then an opcode which is a 9 bit field which uniquely identifies this instruction as a conditional select instruction. There is then a four bit secondary source register specifier $R_m$ which identifies the register that is to be the primary source register for this instruction.

There is then a four bit condition field which specifies the selected conditions and indicates what pattern of flags is required to select either the primary register or the secondary register. There is then a bit that it not used and then there is an increment indicator which is also a single bit field which controls the adder carry in of the earlier figures and determines whether the value stored in the secondary register is incremented or not. There is then a four bit primary source register specifier $R_n$ which identifies the primary source register and there is then the destination register specifier $R_d$. In this regard, the primary and secondary source registers are referred to as "primary" and "secondary" as this is the order they appear in the instruction when it is written and they have no further meaning.

It should be noted that this is simply example instruction coding and the width of the registers operation code and condition fields are indicative only and depend upon the number of instruction registers and test conditions that are supported by the processing apparatus. Furthermore, although in this example registers are used to store the source and destination elements in other embodiments the source and destination storage elements may be locations in memory in which case the data element specifiers will be addresses of memory locations.

Figure 7:
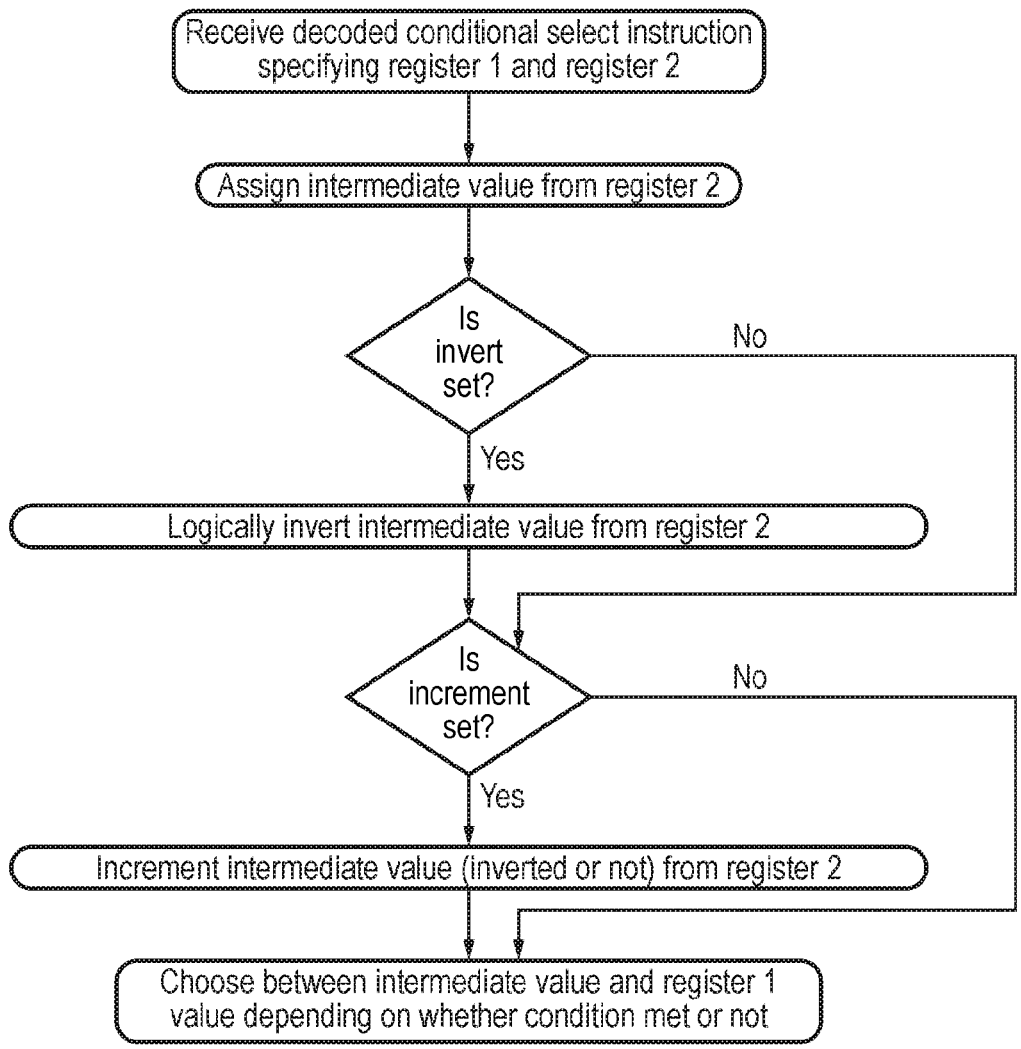
FIG. 7 shows an example encoding of the conditional select instruction.

FIG. 7 shows a flow diagram illustrating steps performed in a method of executing this conditional select instruction. Thus, initially the decoded conditional select instruction is received and this specifies two registers, register1 and register2.

An intermediate value is assigned from register2. It is determined if invert is set or not. If it is the intermediate value is logically inverted. It is determined if increment is set. If increment is set the intermediate value is incremented. A value for output to a destination register is then selected depending on whether the condition specified by the conditional instruction is met or not. Thus, either the intermediate value or the value from register1 is output to a destination register. In some embodiments if the condition is met it is the intermediate value that is output to the destination register, while if the condition is not met it is the value from register1. However, in other embodiments it might be the value in register1 that is output in response to the condition being met and the intermediate value in response to it not being met.

If it is the intermediate value that is output, this value may be the original value from register2, it may be the original value incremented by one, the original value logically inverted, or the original value logically inverted and then incremented by one, depending on whether the conditional select instruction specified an invert operation and/or an increment operation.

Figure 8:
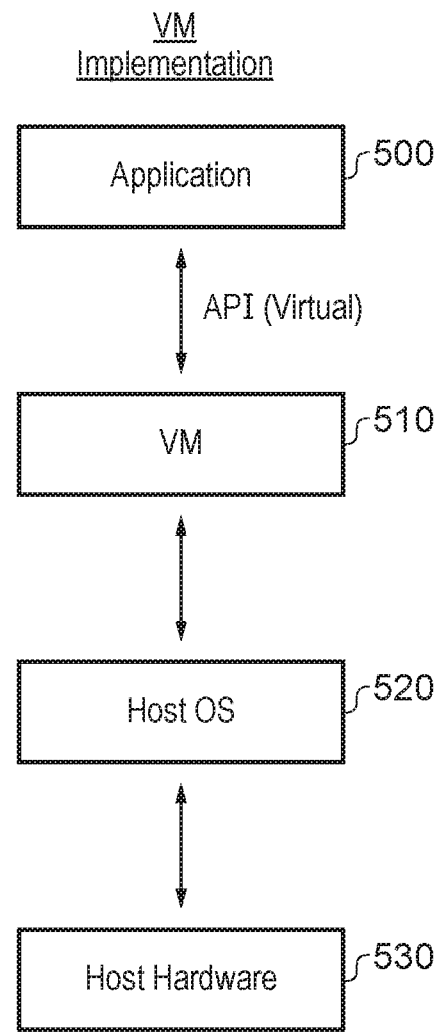
FIG. 8 is a diagram schematically illustrating a virtual machine implementation of the present techniques.

FIG. 8 illustrates a virtual machine implementation that may be used. Whilst the earlier described embodiments implement the present invention in terms of apparatus and methods for operating specific processing hardware supporting the techniques concerned, it is also possible to provide so-called virtual machine implementations of hardware devices. These virtual machine implementations run on a host processor 530 running a host operating system 520 supporting a virtual machine program 510. Typically, large powerful processors are required to provide virtual machine implementations which execute at a reasonable speed, but such an approach may be justified in certain circumstances, such as when there is a desire to run code native to another processor for compatibility or re-use reasons. The virtual machine program 510 provides an application program interface to an application program 500 which is the same as the application program interface which would be provided by the real hardware which is the device being modelled by the virtual machine program 510. Thus, the program instructions, including the control of memory accesses described above, may be executed from within the application program 500 using the virtual machine program 510 to model their interaction with the virtual machine hardware.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. A data processing apparatus comprising:
   a data store comprising a plurality of storage elements for storing data elements;
   an instruction decoder configured to decode at least one conditional select instruction, said at least one conditional select instruction comprising a primary source storage element field specifying a primary source storage element, and a secondary source storage element field specifying a secondary source storage element, wherein said at least one conditional select instruction further specifies a condition and an operation to be performed on a data element stored in said secondary source storage element;
   a data processor configured to perform data processing operations controlled by said instruction decoder wherein:
   said data processor is responsive to said decoded at least one conditional select instruction and said condition having a predetermined outcome to perform said operation on said data element from said secondary source storage element to output a resultant data element;
   said data processor is responsive to said decoded at least one conditional select instruction and said condition not having said predetermined outcome to output said data element within said primary source storage element as said resultant data element;

and wherein, when said at least one conditional select instruction is a conditional select invert instruction, said instruction decoder is configured to output an invert control signal; and said data processor comprises:

an adder configured in response to said invert control signal being set to receive said data value from said secondary source storage element through an inverter and in response to said invert control signal not being set to receive said data value from said secondary source storage element not passed through said inverter;

a multiplexer configured to receive signals from said primary source storage element and from an output of said adder, a select signal for said multiplexer comprising said condition, such that said condition having said predetermined outcome triggers said multiplexer to select said output of said adder.

2. A data processing apparatus according to claim 1, wherein said instruction further specifies a destination storage element, said data processor being responsive to said at least one conditional select instruction to store said resultant data element in said destination storage element.

3. A data processing apparatus according to claim 2, wherein said destination storage element comprises one of said primary and secondary source storage elements.

4. A data processing apparatus according to claim 1, wherein said data processor is responsive to said decoded at least one conditional select instruction and said condition not having said predetermined outcome to perform said operation on said data element within said secondary source storage element and to form said resultant data element from said data element within said primary storage element.

5. A data processing apparatus according to claim 1, wherein said at least one conditional select instruction comprises an increment conditional select instruction, said operation comprising incrementing said data element from said secondary source storage element.

6. A data processing apparatus according to claim 1, wherein said at least one conditional select instruction comprises an invert conditional select instruction, said operation comprising logically inverting said data element from said secondary source storage element to generate a logically bitwise inverted storage element value.

7. A data processing apparatus according to claim 1, wherein said at least one conditional select instruction comprises an invert increment conditional select instruction, said operation comprising logically inverting said data element from said secondary source storage element and incrementing it to generate an arithmetic negation of said data element.

8. A data processing apparatus according to claim 1, wherein said storage element data store comprises a storage element name that maps to a zero value.

9. A data processing apparatus according to claim 1, wherein said storage elements comprise registers and said storage element data store comprises a register bank.

10. A data processing apparatus according to claim 1, wherein said storage elements comprise memory locations and said storage element data store comprises a memory.

11. A data processing apparatus according to claim 1, wherein said instruction decoder is configured to output an increment control signal in response to said conditional select instruction; and said processor configured to process said decoded conditional select instructions comprises:

an adder configured to receive values from said secondary storage element and a carry in signal;

a multiplexer configured to receive signals from said primary storage element and from an output of said adder, a select signal for said multiplexer comprising said condition, such that said condition having said predetermined outcome triggers said multiplexer to select said output of said adder; wherein in response to said increment control signal being set, said carry in signal is set to one and said adder increments a received value from said at least one source storage element.

12. A data processing apparatus according to claim 11, wherein said instruction decoder is configured to output an increment control signal and an invert control signal in response to said conditional select instruction; wherein in response to said increment signal being set, said carry in signal is set to one and in response to said invert signal having being set said adder increments said received inverted value from said secondary source storage element.

13. A data processing apparatus according to claim 1, wherein said primary source storage element and said secondary source storage element are a same storage element.

14. A data processing apparatus according to claim 1, wherein an outcome of said condition is determined from arithmetic logic flags set in response to at least one previous data processing operation.

15. A data processing apparatus according to claim 14, wherein sat at least one previous data processing operation comprises comparing a data element within at least one of said source storage elements with another value.

16. A data processing apparatus according to claim 15, wherein said at least one previous data processing operation comprises comparing a data element in said primary source storage element with a data element in said secondary source element.

17. A data processing apparatus according to claim 14, wherein said condition comprises at least one of not equal, equal, less than, greater than, greater than or equal, less than or equal, zero and negative.

18. A data processing apparatus according to claim 14, wherein said arithmetic logic flags, comprise at least one of a result negative flag, a result zero flag, a carry out flag and a signed overflow flag.

19. A data processing apparatus according to claim 1, wherein said predetermined outcome of said condition comprises said condition being met.

20. A data processing apparatus according to claim 1, said conditional select instruction comprising an indicator indicating a width of said source and destination storage elements.

21. A data processing apparatus according to claim 1, said data processing apparatus comprising arithmetic circuitry for performing add and subtract operations in response to arithmetic instructions, wherein at least some of said circuitry for performing said operation on said data element within said secondary source storage element in response to said conditional select instruction comprises said arithmetic circuitry.

22. A method of data processing apparatus comprising: receiving at least one conditional select instruction comprising a primary source storage element field specifying a primary source storage element, and a secondary source storage element field specifying a secondary source storage element, wherein said at least one conditional select instruction further specifies a condition and an operation to be performed on a data element within said secondary source storage element; decoding said at least one received conditional select instruction; when said at least one conditional select instruction is a condition select invert instruction, outputting an invert control signal; determining whether said condition has a predetermined outcome; in response to said invert control signal being set, receiving at an adder said data value from said secondary source storage element through an inverter; in response to said invert control signal not being set, receiving at said adder said data value from said secondary source storage element not passed through said inverter; receiving signals at a multiplexer from said primary source storage element and from an output of said adder, wherein a select signal for said multiplexer comprises said condition, such that when said condition has said predetermined outcome said multiplexer selects said output of said adder to output as a resultant data element; and when said condition does not have said predetermined outcome, said multiplexer selects said data element within said primary source storage element to output as said resultant data element.

23. A method according to claim 22, comprising performing an additional step of:
storing said resultant data element in a destination storage element specified by said at least one conditional select instruction.

24. A method of processing data according to claim 22, wherein said step of determining if said condition has said predetermined outcome is performed after said operation is performed on said data element from said secondary source storage element.

25. A method of processing data according to claim 22, wherein said at least one conditional select instruction comprises an increment conditional select instruction, said operation comprising incrementing said data element from said secondary source storage element.

26. A method of processing data according to claim 22, wherein said at least one conditional select instruction comprises an invert conditional select instruction, said operation comprising logically inverting said data element from said secondary source storage element to generate a logically bitwise inverted storage element value.

27. A method of processing data according to claim 22, wherein said at least one conditional select instruction comprises an invert increment conditional select instruction, said operation comprising logically inverting said data element from said secondary source storage element and incrementing it to generate an arithmetic negation of said data element.

28. A non-transitory computer readable storage medium storing a computer program comprising a conditional select instruction, which is operable when executed on a data processor to control the data processor to perform the steps of the method according to claim 22.

29. A means for processing data comprising:
means for storing data elements in storage elements;
means for decoding at least one conditional select instruction, said at least one conditional select instruction comprising a primary source storage element field specifying a primary source storage element, and a secondary source storage element field specifying a secondary source storage element, wherein said at least one conditional select instruction further specifies a condition and an operation to be performed on a data element from said secondary source storage element;
means for performing data processing operations controlled by said means for decoding wherein:
said means for performing data processing operations is responsive to said decoded at least one conditional select instruction and said condition having a predetermined outcome to perform said operation on said data element from said secondary source storage element to output a resultant data element; and
said means for performing data processing operations is responsive to said decoded at least one conditional select instruction and said condition not having said predetermined outcome to output said data element within said primary source storage element as said resultant data element,
and wherein, when said at least one conditional select instruction is a conditional select invert instruction, said means for decoding is configured to output an invert control signal; and
said means for performing data processing operations comprises:
means for adding configured, in response to said invert control signal being set, to receive said data value from said secondary source storage element through a means for inverting and in response to said invert control signal not being set to receive said data value from said secondary source storage element not passed through said means for inverting;
means for multiplexing, configured to receive signals from said primary source storage element and from an output of said means for adding, a select signal for said means for multiplexing comprising said condition, such that said condition having said predetermined outcome triggers said means for multiplexing to select said output of said means for adding.

30. A virtual machine provided by a computer program executing upon a data processing apparatus, said virtual machine providing an instruction execution environment according to the data processing apparatus as claimed in claim 1.

* * * * *